United States Patent [19]

Kranz et al.

[11] Patent Number: 5,413,016
[45] Date of Patent: May 9, 1995

[54] METHOD FOR MANUFACTURING CUTTING TOOLS AND CUTTING TOOLS MADE THEREBY

[75] Inventors: Uwe Kranz, Horb-Nordstetten; Roland Brobeil, Rottenburg-Ergenzingen; Bernd Hamann, Horb-Nordstetten, all of Germany

[73] Assignee: Ledermann GmbH, Horb a.N., Germany

[21] Appl. No.: 75,766

[22] Filed: Jun. 11, 1993

[30] Foreign Application Priority Data

Apr. 5, 1993 [EP]  European Pat. Off. ......... 93105583.4

[51] Int. Cl.$^6$ ............................................. B21K 5/02
[52] U.S. Cl. ....................................... 76/108.1; 408/144
[58] Field of Search .................. 76/108.1, 108.2, 108.4, 76/108.6, 115, DIG. 5, DIG. 10, DIG. 11, DIG. 12; 408/144, 145

[56]  References Cited

U.S. PATENT DOCUMENTS

| | | |
|---|---|---|
| 1,441,687 | 1/1923 | Jones . |
| 1,833,099 | 11/1931 | Welch et al. . |
| 2,973,047 | 2/1961 | Edgar et al. ................. 76/108.1 |
| 4,730,765 | 3/1988 | Tomlinson et al. . |
| 5,272,940 | 12/1993 | Diskin ............................ 76/108.6 |

FOREIGN PATENT DOCUMENTS

| | | |
|---|---|---|
| 0195338 | 9/1986 | European Pat. Off. . |
| 1815209 | 10/1969 | Germany . |
| 3815917 | 11/1989 | Germany . |
| 4008102 | 9/1991 | Germany . |
| 588910 | 6/1977 | Switzerland . |
| 958384 | 11/1960 | United Kingdom . |

OTHER PUBLICATIONS

Andy Davies; Induction Brazing for Diamond Toolmakers; Jun. 1992; pp. 325–327.

*Primary Examiner*—Hwei Siu Payer
*Attorney, Agent, or Firm*—Robert W. Becker & Associates

[57] ABSTRACT

In a method of manufacturing tools having attached thereto cutting plates with a cutting edge coated with a hard cutting material, the cutting plates are first positioned on the cutting tool body in a desired position and fixed on the cutting tool body in that desired position by electric spot welding. Subsequently, the soldering material is applied to each cutting plate. Soldering of the cutting plates to the cutting tool body is performed at a temperature of 720° C. to 850° C. in a vacuum of $10^{-4}$ to $10^{-6}$ mbar. In a final step, the cutting tool body with the cutting plates soldered thereto is slowly cooled in the vacuum oven.

11 Claims, 1 Drawing Sheet

METHOD FOR MANUFACTURING CUTTING TOOLS AND CUTTING TOOLS MADE THEREBY

BACKGROUND OF THE INVENTION

The present invention relates to a method for manufacturing cutting tools such as milling cutters, drills etc. which are provided with cutting plates having cutting edges with a coating of polycrystalline diamond, hard metals, ceramic materials or similar cutting materials wherein the cutting plates are, after their positioning on the cutting tool body, fixedly connected thereto by soldering. Known cutting tools, for example, milling cutters, are commonly manufactured such that in a cutting process cutting grooves and seats for the cutting plates as well as wings are produced on the cutting tool body of the milling tool whereby the grain flow of the crystal structure of the cutting tool body is at least partially substantially destroyed and notches are formed that will affect the tension compensation within the tool. Such a method is known from German Offenlegungsschrift 38 15 917. After the completion of the cutting process of the cutting tool body, the cutting plates are inserted into their plate seats and soldered to the cutting tool body. For this purpose, the individual plate seats are coated with a flux medium and then the first plate seat is locally heated to the soldering temperature and the soldering material is applied. Subsequently, the individual cutting plate is positioned within the seat, for example, with the aid of a pair of tweezers, and aligned. Parallel to this method step heat is applied in order to be able to perform the soldering process. After the first cutting plate has been correctly positioned and correctly soldering, the next cutting plate is soldered to the cutting tool body in the same manner. Due to the soldering of the next cutting plate the already attached cutting plate which has cooled off in the meantime is again heated by the heat of the second soldering step. In this manner all cutting plates are soldered to the cutting tool body one after another. When a certain temperature is surpassed, precipitation of graphite occurs at the cutting edge cover layer thereby destroying the polycrystalline diamond structure. Since this is already possible at a relatively low temperature, it is common practice to use only low temperature soldering materials that consequently do not result in a high soldering stability. It is especially disadvantageous that the cutting tool body and the cutting plates to be connected thereto are not subjected to a uniform and continuous heating and that the product quality resulting from the aforementioned steps depends greatly on the skills of the workmen. Accordingly, with the known methods uniform quality standards are hard to achieve because, on the one hand, the degree of coating of the soldering surfaces depends greatly on the force with which the cutting plates are pressed into the plate seats, and, on the other hand, soldering material must cover uniformly the entire seat and gas bubbles of the flux medium must be able to escape. Furthermore, the quality, the service life as well as the load capacity of the tool and of the cutting plates depends on the respective soldering temperature during the individual soldering process of the cutting plates to the cutting tool body.

It is therefore an object of the present invention to provide a method with which the aforementioned disadvantages can be avoided and which ensures that the cutting plates are exactly positioned on the base body of the tool, that all cutting plates are connected to the cutting tool body with the same high degree of fastness, and that this can also be ensured for a plurality of cutting tools manufactured within the same working cycle. It is furthermore an object of the present invention to provide a cutting tool that requires a reduced cutting expenditure for manufacture, provides improved seating and soldering and thus increased fastness.

BRIEF DESCRIPTION OF THE DRAWING

This object, and other objects and advantages of the present invention, will appear more clearly from the following specification in conjunction with the accompanying drawings, in which.

SUMMARY OF THE INVENTION

Figure 1:
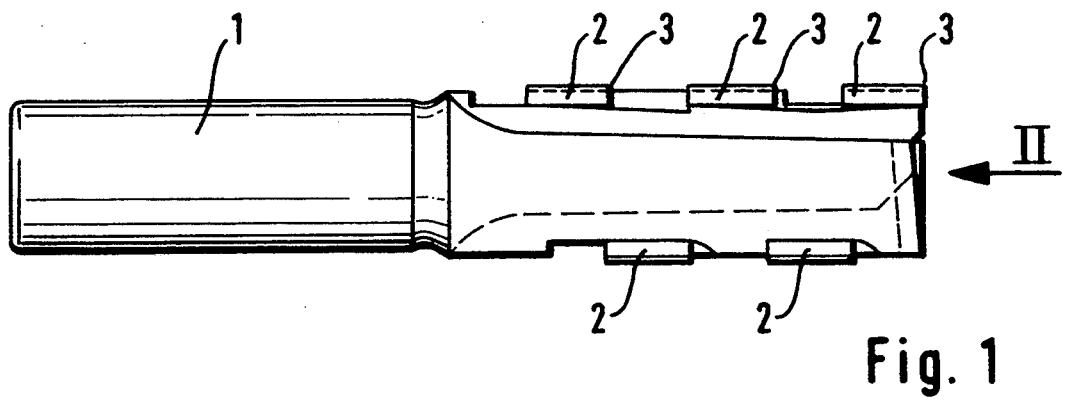
FIG. 1 shows a milling tool having cutting plates distributed over its circumference.

The method of manufacturing cutting tools according to the present invention is primarily characterized by the steps of:

a) Positioning cutting plates on a cutting tool body in a desired position;

b) Fixing the cutting plates on the cutting tool body in the desired position by electric spot welding;

c) Applying soldering material to each cutting plate;

d) Soldering the cutting plates to the cutting tool body at a temperature of 720° C. to 850° C. in a vacuum of $10^{-4}$ to $10^{-6}$ mbar; and e) Slowly cooling the cutting tool body with cutting plates soldered thereto.

By fixing the cutting plates to the cold cutting tool body by electric spot welding before the subsequent soldering process at their exactly defined plate seats, it is possible to insert, position, and attach the cutting plates very accurately because this process is not subject to any time restrictions so that this method step is substantially simplified. Furthermore, the soldering paste or material can be carefully introduced into the plate seats of the cold cutting tool body before the actual soldering step. This makes it possible that small cutting plates can also be economically inserted and attached. The resistance welding process can be performed by capacitor discharge. During this welding process, especially when cutting tool body and cutting plates are coated, an alloy may be formed which has a melting point that is higher than the melting point of the individual components. This is advantageous for the subsequent vacuum sautering process. Furthermore, the flowability of the soldering material is improved and, due to the exact positioning and fixation of the cutting plates during the actual soldering process, identical pressing ratios and identical capillary effects of the soldering material will always result. During the subsequent vacuum soldering step higher temperatures of 720° C. to 850° and vacuums of $10^{-4}$ to $10^{-6}$ mbar can be applied without causing a reducing graphite formation of the polycrystalline diamond surface which would reduce the service life of the tool. The application of higher temperatures furthermore allows the use of a corresponding high temperature soldering material so that the fastness of the soldered connection is substantially increased. It is furthermore advantageous that during the vacuum soldering process a flux medium is no longer needed. Thus, flux medium inclusions or flux medium remains which negatively affect the soldering fastness can be avoided. Also, by employing a vacuum soldering process, better and more uniform load conditions can be achieved at the seats whereby the soldering fastness is also increased.

Because a soldering material with a higher freezing point line can be used as a result of the higher working temperature during the vacuum soldering process, the fastness of the connection is further increased, respectively, cutting plates with a smaller seat surface can be used for the same desired cutting forces. The cooling process preferably is carried out within the vacuum device after completion of the method and is performed continuously and controlled such that inherent tension or strain within the cutting tool body is prevented. Advantageously, the cooling step is controlled such that a desired hardness of the cutting tool body can be achieved.

It is furthermore important that the hardening is performed with the soldering heat because by doing so with a suitable material selection the tool can obtain the required hardness over the entire cross-section so that metallurgical notches resulting during induction soldering can be prevented. In summarizing the above, the manufacture with the inventive method is substantially simplified because the entire soldering process and its preparation can be automized. Accordingly, it is ensured that the same soldering quality can be achieved for all cutting plates attached to the cutting tool body. Furthermore, it is possible to subject a plurality of cutting tool bodies provided with cutting plates to a common vacuum soldering process without being dependent on the operator's skills with respect to the quality of the products. The soldering and heat treatment of the tools are performed within one working cycle, i.e. with the same heat.

In order to reach an improved soldering effect it may be advantageous when, before fixing the cutting plates to the cutting tool body, the cutting tool body is provided with a reactive metallic layer, for example, nickel. Just as the electric welding can be performed at certain spots, it is also possible to apply the soldering material in the form of a soldering paste in a spotted distribution only to certain spots. A further important feature of the inventive method is that the cutting tool body with its seats for the cutting plates is no longer produced by a cutting operation, but by material forming, for example, by forging, pressing, or casting as a molded part. This results in a favorable Grain flow of the base structure of the cutting tool body which is no longer disturbed by cutting operations because the cutting or machining step is limited to individual portions of the cutting tool body, for example, to the seats for the cutting plates.

The method according to the present invention in a further embodiment can be performed such that a plurality of cutting tool bodies with cutting plates fixed thereto, optionally with employing a protective or inert gas, can be simultaneously heated to and maintained at the temperature within a single working step in the vacuum soldering oven. In this manner a very economical simultaneous manufacture of a plurality of tools under identical process conditions is possible so that quality standards for these tools can be ensured.

The inventive method further allows for the production of cutting tools in which the cutting plates no longer must be semi-circular, as, for example, known from German Offenlegungsschrift 38 15 917, but can have the shape of a rhomboid or a trapezoid whereby the seats at the cutting tool body correspond to the contours of the rhomboidal or trapezoidal cutting plates.

For a cutting plate in the shape of a rhomboid it is advantageous when the slanted sides of the rhomboid have an angle of approximately 20° to 30°, preferably 25°, to the base of the rhomboid whereby one of these slanted sides and the corresponding base of the thomboid form the seating surfaces at the cutting tool body. At the slanted side which is connected by soldering a form-fitting connection results which upon load by cutting forces actually mechanically supports the cutting plate. Accordingly, the soldering fastness is additionally improved by the slanted sides.

Description of Preferred Embodiments

Figure 2:
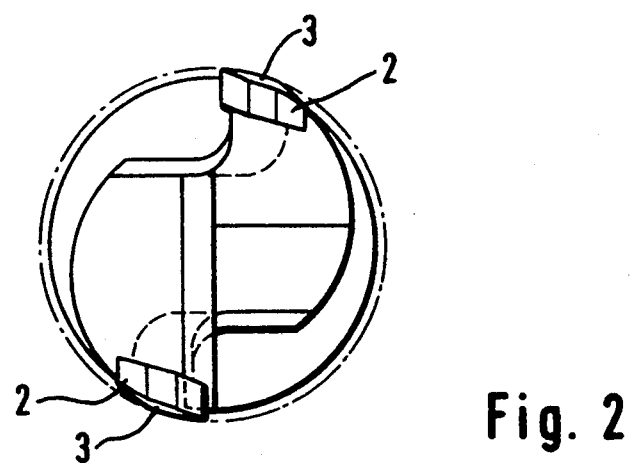
FIG. 2 shows an end view of the milling tool of FIG. 1 in the direction of arrow II.
Figure 3:
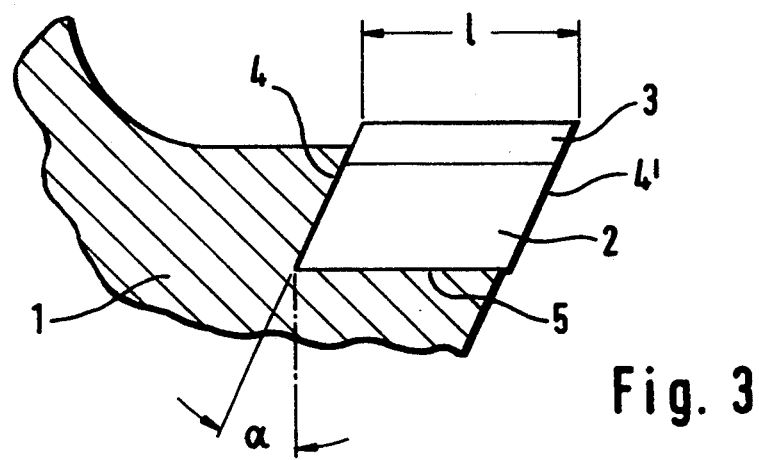
FIG. 3 is a part-sectional view of the cutting tool body with a cutting plate in the shape of a rhomboid.

As can be seen in FIG. 1, the cutting tool body or base body 1 is provided with a plurality of cutting plates 2 arranged at a distance from one another about the circumference of the cutting tool body 1. The cutting tool body 1 is produced by material forming, for example, by compressing, pressing, or forging. The cutting plates 2 can be comprised of hard metal having a cutting layer 3 made of polycrystalline diamond or a ceramic material. As can be seen in FIG. 3, the cutting plate 2 has the shape of a rhomboid whereby preferably the two slanted sides 4, 4' of the rhomboid are oriented at an angle of 25° relative to the base of the rhomboid. Correspondingly, the seat and abutment surface of the slanted side 4 of the cutting plate 2 within the cutting tool body is positioned at an angle alpha of preferably 25°. This results in a considerably increased soldering surface also within the area of the base surface 5 of the rhomboid as compared to a rectangular cutting plate. With the increase of the soldering surface an increased soldering fastness results, i.e., when needed it is therefore also possible for the same loads acting on the milling tool to use smaller size cutting plates. From FIG. 2 it may be taken that the cutting plates 2 are positioned at an angle of 25° with respect to the base body 1 of the tool. The base body 1 of the tool is produced by material forming, for example, in an injection molding process, from steel and only slightly machined in a cutting process, especially within the area of the seats for the cutting plates. The shape of the base body 1 is substantially corresponding to the final shape of the milling tool, and it is therefore only required to perform a cutting fine machining process.

In the manufacture pursuant to the inventive method the cutting plates 2 can be satisfactorily inserted into the seats at the base body 1 whereby it is always ensured that in the vacuum oven sufficient soldering material is introduced into the existing capillary slot between the cutting plate and the seat surface of the seat. It is possible to exactly portion the soldering material so that excess soldering material can by prevented, as is known from the prior art manufacturing methods, can exude from the slot requiring subsequent removal by sandblasting.

The present invention is, of course, in no way restricted to the specific disclosure of the specification and drawings, but also encompasses any modifications within the scope of the appended claims.

What we claim is:

1. A method of manufacturing cutting tools having attached thereto cutting plates with a cutting edge coated with a hard cutting material, said method comprising the steps of:
- a) positioning cutting plates on a cutting tool body in a desired position;
- b) fixing the cutting plates on the cutting tool body in said desired position by electric spot welding;
- c) applying soldering material to each cutting plate;
- d) soldering the cutting plates to the cutting tool body at a temperature of 720° C. to 850° C. in a vacuum of $10^{-4}$ to $10^{-6}$ mbar; and
- e) slowly cooling the cutting tool body with the cutting plates soldered thereto.

2. A method according to claim 1, further comprising the step of:
coating the cutting tool body with a reactive layer before carrying out step b).

3. A method according to claim 2, further comprising the step of applying nickel as the reactive layer.

4. A method according to claim 1, further comprising the step of applying a paste as the soldering material in a spotted distribution.

5. A method according to claim 1, further comprising the step of performing the cooling step in a controlled manner within a vacuum oven.

6. A method according to claim 5, further comprising the step of adjusting in a controlled manner the hardness of the cutting tool body by controlling the cooling step.

7. A method according to claim 1, further comprising the step of producing the cutting tool body comprising seats for the cutting plates by material forming.

8. A method according to claim 7, further comprising the step of performing the step of producing the cutting tool body by a method selected from the group consisting of forging, pressing, and injection molding.

9. A method according to claim 1, further comprising the steps of:
introducing a plurality of the cutting tool bodies with cutting plates fixed thereto by electric spot welding into a vacuum oven;
simultaneously heating the cutting tool bodies to the same soldering temperature; and
maintaining the cutting tool bodies at said same soldering temperature.

10. A method according to claim 9, further comprising the step of employing a protective gas within the vacuum oven.

11. A method according to claim 1, further comprising the step of coating the cutting plates with a hard cutting material selected from the group consisting of polycrystalline diamond, a hard metal, and ceramic.

* * * * *